United States Patent [19]

Lahr

[11] 4,078,799

[45] Mar. 14, 1978

[54] TOY VEHICLE AND TOY VEHICLE GAME

[75] Inventor: Robert G. Lahr, Reseda, Calif.

[73] Assignee: Ideal Toy Corporation, Hollis, N.Y.

[21] Appl. No.: 783,722

[22] Filed: Apr. 1, 1977

Related U.S. Application Data

[62] Division of Ser. No. 747,441, Dec. 6, 1976.

[51] Int. Cl.² .......................... A63F 9/14; A63H 18/12
[52] U.S. Cl. .................................. 273/86 B; 46/261; 46/262
[58] Field of Search ................ 273/86 B; 46/251, 253, 46/254, 255, 256, 257, 258, 259, 260, 261, 262

[56] References Cited

U.S. PATENT DOCUMENTS

| 3,232,005 | 2/1966 | Lahr ........................................ 46/253 |
| 3,453,970 | 7/1969 | Hansen ............................. 46/251 X |
| 3,813,812 | 6/1974 | Barlow et al. ......................... 46/259 |

FOREIGN PATENT DOCUMENTS

| 2,014,581 | 5/1971 | Germany ............................... 46/251 |

*Primary Examiner*—Anton O. Oechsle
*Attorney, Agent, or Firm*—Richard M. Rabkin

[57] ABSTRACT

A toy vehicle game includes an endless track defining at least two parallelly extending vehicle lanes in which two or more toy vehicles are adapted to be operated. The toy vehicles each include a reversible rotary drive motor and a transmission operatively engaged between the motor and two drive wheels for rotating one or the other of the drive wheels in response to the direction of rotation of the drive motor, thereby biasing the car against one or the other of the side walls of the track to guide the vehicle along its path of travel in one or the other of the lanes. The track includes electrical contact strips which supply power to the drive motor of the vehicles through current collectors mounted thereon. A control system permits the operators to separately and independently control current to the contact strips and also to selectively reverse the polarity of the current so that the operators can vary the speed of their associated vehicles and cause the vehicles to move from one lane to the other.

12 Claims, 9 Drawing Figures

TOY VEHICLE AND TOY VEHICLE GAME

This application is a division of U.S. Patent Application Ser. No. 747,441 filed Dec. 6, 1976, the disclosure of which is incorporated herein by reference as though fully set forth herein.

The present invention relates to a toy vehicle game and a control system therefor. More particularly the invention relates to a toy vehicle game in which the toy vehicles are separately controlled by the players to enable them to turn out from one lane to the other and pass other vehicles on the track.

With the ever increasing popularity of toy vehicle games, such as for example the well known "slot car" games, there is an increasing demand for more realistic action. To this end attempts have been made in the past to provide "slot car" type games with speed control systems, as for example by varying current flow to the vehicles in the game. To further enhance such realism the slot arrangements in such games also provide for crossing the vehicles from one side of the track to another, to simulate an actual changing of lanes. However, the vehicle is in fact constrained to a fixed predetermined and unvariable path.

Since the play value of such previously proposed vehicle games is limited to the regulation of speed of travel, attempts have been made to provide toy vehicle games which enable an operator to control movement of the vehicle from one lane to the other without the constraint of a guide slot in the track. Such systems include for example the type shown in U.S. Pat. No. 3,797,404, wherein solenoid actuated bumpers are used to physically push the vehicle from one lane to the other by selectively engaging the bumpers along the side walls of the track. It is believed that this type of system will not insure movement of the vehicle from one lane to the other, particularly at slow speeds, and the bumper movements for pushing the vehicle are not realistic.

Other attempts to provide for vehicle control for moving the vehicle from one lane to the other involve relatively complicated steering control mechanisms which respond to the switching on and off of current to the toy vehicle as supplied through contact strips in the track surface. Such systems are disclosed for example in U.S. Pat. Nos. 3,774,340 and 3,837,286. However, in addition to the relative complexity of the steering arrangements, the vehicles will of course lose speed when the current supply is shut off, so that the vehicle will slow down and the realistic effect desired to be produced is affected.

Still other steering systems have been provided in toy vehicles wherein the vehicle's steering is controlled in response to a reversal of the polarity of the current flow to the electrical drive motor in the vehicle. Such systems are disclosed for example in U.S. Pat. Nos. 3,453,970 and 3,813,812, which avoid the problem of stopping current flow completely to the motor so that there is little or no loss of speed, but their steering systems contain numerous moving parts which will wear and require constant attention in U.S. Pat. No. 3,453,970 to Hansen, the electrical wires connecting the motor to the current collectors of the vehicle are used to aid in the steering operation and thus may well work loose during use of the vehicle. Another reversing polarity system is shown in U.S. Pat. No. 3,232,005 wherein the toy vehicle does not operate on a track and the steering control is not provided for switching lanes, but rather to provide an apparently random travel control for the vehicle.

Still another toy vehicle game which has been suggested to avoid the constraints of slot car type systems is disclosed in U.S. Pat. No. 3,239,963 wherein a relatively complex steering control is provided which is responsive to the actuation of a solenoid mounted in the toy vehicle and is controlled remotely by the players.

It is an object of the present invention to overcome the limitations of previously proposed toy vehicle games wherein toy vehicles are permitted to turn out and move from one lane to the other without the restraint of a guide slot or the like.

Still another object of the present invention is to provide a toy vehicle which is adapted to move along a guide track and change from one lane to the other, under the control of a player.

A still further object of the present invention is to provide a toy vehicle game in which separate vehicles can be separately controlled by the players to move from one lane to the other and pass one another.

A further object of the present invention is to provide a control system for toy vehicles which enables the toy vehicles to turn out and pass one another along a guide track.

A still further object of the present invention is to provide an improved toy vehicle game.

Another object of the present invention is to provide a toy vehicle game of the character described which is relatively simple in construction and durable in operation.

Yet another object of the present invention is to provide a toy vehicle game, as well as a control system therefor, which is relatively simple and economical to manufacture.

In accordance with an aspect of the present invention, a toy vehicle and toy vehicle game are provided in which one or more toy vehicles are used which include a frame, a body mounted on the frame and a plurality of ground engaging wheels, including a pair of drive wheels. The drive wheels are mounted in the frame for independent rotation in laterally spaced vertical planes and a reversible electric motor is also provided for selectively driving the wheels. A drive transmission is mounted in the frame to connect the output of the electrical motor to the drive wheels. This drive transmission includes at least one transmission element which is movably mounted in the frame for movement between first and second positions in response to the direction of rotation of the drive motor thereby to drive one or the other of the drive wheels. The toy vehicles are preferably used on an endless track having laterally spaced side walls defining two vehicle lanes therebetween. When the vehicles are operated with only one or the other of their drive wheels driven from their respective motors, the vehicles will move into engagement with and be guided along one of these side walls.

The power supply to the electrical motors of the vehicles is provided through electrical contact strips located in the lanes of the vehicle track. This power supply system is constructed to enable the operators to separately control the speed of the vehicles and also to separately reverse the polarity of current flow to the electrical motors of the vehicles, whereby the vehicles will change lanes. In addition the vehicles are provided with a relatively simple shock absorbing front end system which absorbs the impact of the vehicle against the side walls during a lane change and directs the front wheels of the vehicle in the desired path of travel.

The above, and other objects, features and advantages of this invention will be apparent in the following detailed description of illustrative embodiments thereof, which are to be read in connection with the accompanying drawings, wherein.

Figure 1:
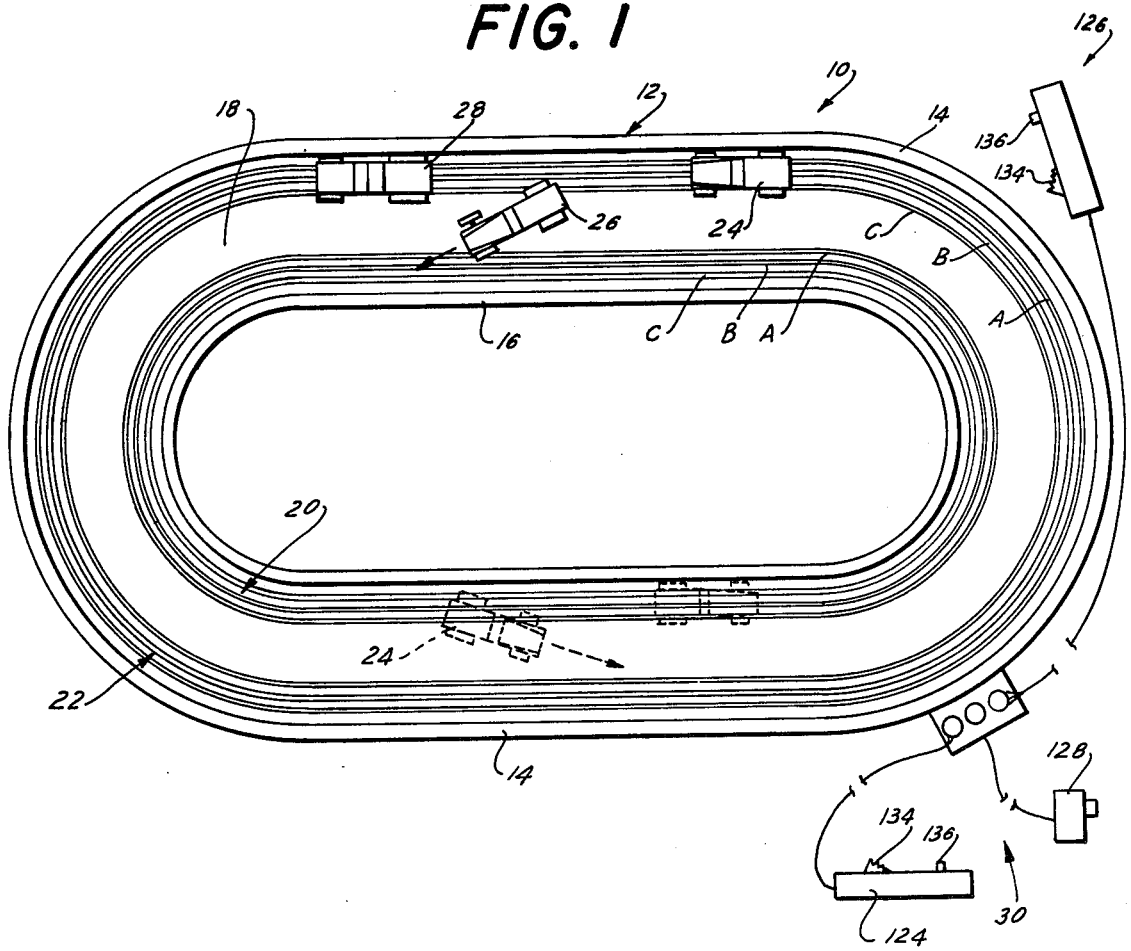
FIG. 1 is a plan view of a toy vehicle game constructed in accordance with the present invention.

Referring now to the drawings in detail, and initially to FIG. 1 thereof, the toy vehicle game 10, constructed in accordance with the present invention, includes an endless plastic track 12 having a pair of laterally spaced upstanding side walls 14, 16 and a road bed or tread surface 18 extending therebetween. The road bed 18 has a width sufficient to define at least two vehicle lanes 20, 22 thereon along which a plurality of vehicles can be operated.

In the illustrative embodiment of the present invention the toy vehicle game includes operator controlled vehicles 24, 26 which are of substantial identical construction except for the arrangement of their current collectors as described hereinafter. In addition, a drone car 28, which moves along the track at a relatively constant speed may also be provided.

Vehicles 24, 26 are separately controlled by the players through a control system 30 which enables the players to vary current supply to the electrical motors in the vehicles, thereby to vary the vehicle speed. The controllers also enable the players to change the polarity of current supplied to the respective vehicle motors, whereby the vehicles can be switched by the players from one lane to the other. The drone car 28 on the other hand moves along the vehicle track at a constant speed providing an obstacle along the track which the player controlled cars 24, 26 must pass. The front wheels of the drone car are preferably canted in one direction or the other so that the drone will normally be driven in either the inner or the outer lane depending on the position of the wheels. This vehicle includes an electric motor operated by a battery contained within the vehicle, and connected through a direct drive transmission of any convenient construction to the rear wheels thereof. Preferably, drone vehicle 28 is of the type illustrated and described in detail in co-pending U.S. Patent Application Ser. No. 747,442 filed Dec. 6, 1976 and commonly assigned herewith. The disclosure of said U.S. Patent Application Ser. No. 747,442 is incorporated herein by reference.

Figure 2:
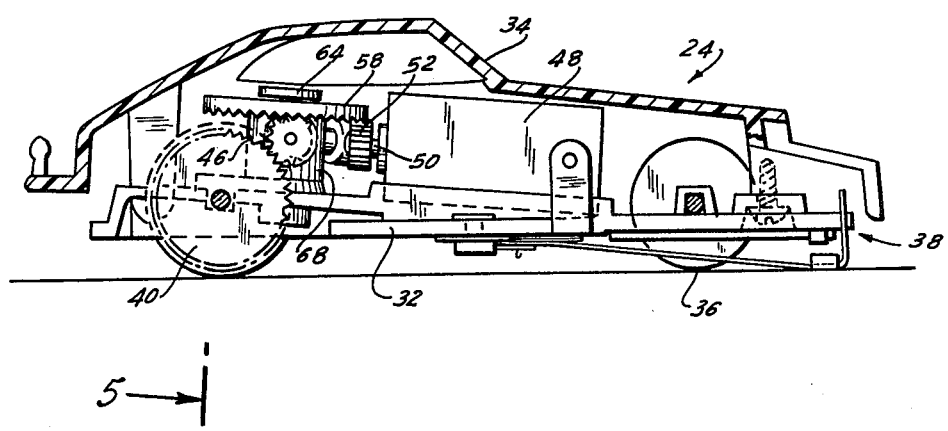
FIG. 2 is a longitudinal sectional view of the toy vehicle adapted for use with the game of FIG. 1.
Figure 3:
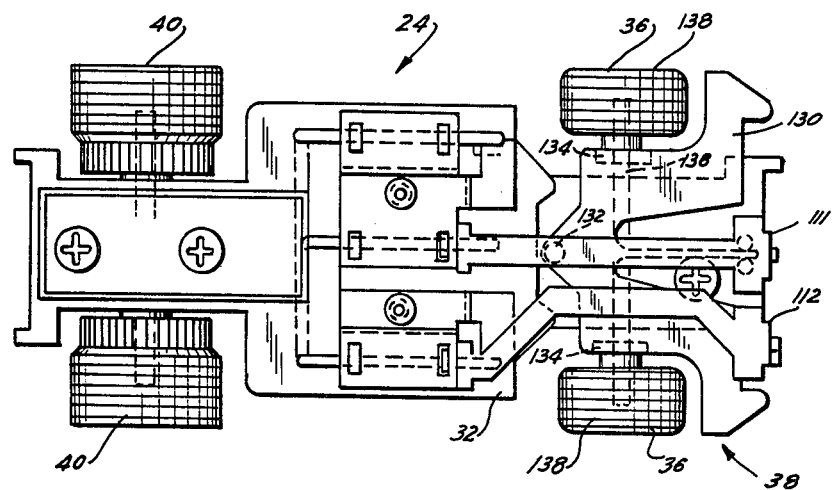
FIG. 3 is a bottom view of one of the toy vehicles illustrated in FIG. 1.
Figure 4:
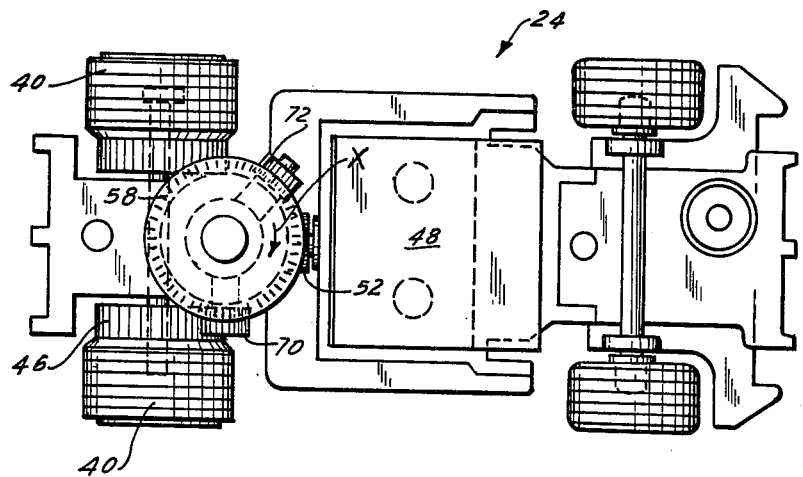
FIG. 4 is a top plan view of the toy vehicle shown in FIG. 2, but with the body removed.
Figure 5:
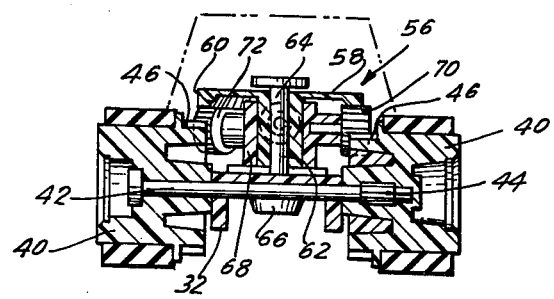
FIG. 5 is a sectional view taken along line 5—5 of FIG. 2.

Toy vehicle 24 is illustrated in detail in FIGS. 2–4. As seen therein the vehicle includes a frame or chassis 32 of any covenient construction, and a removable plastic body or shell 34 which may be snap fit on frame 32 in any convenient manner. A pair of front wheels 36 are rotatably mounted on the frame, through a shock absorbing front end system 38, described more fully hereinafter, while the rear wheels 40 are rotatably mounted for independent rotation on a shaft 42 rotatably mounted in frame 32. (See FIG. 5). One of the drive wheels 40 is fixed on shaft 42 by a spline 44 or the like, while the other of the wheels is freely rotatably mounted on the shaft. Alteratively both wheels can be freely rotatably mounted on the shaft or axle 48. With either arrangement the wheels can be separately and independently driven.

Each of the drive wheels 40 is formed from either a molded plastic material or from a cast metal material, and has on its inner side an integral spur gear 46 formed thereon by which rotary power is supplied to the respective wheels.

The power for driving the toy vehicle is supplied from a D.C. electric motor 48 mounted on frame 32 in any convenient manner. The electric motor is of conventional D.C. construction and includes a rotary output member of shaft 50 connected to the rotor of the motor in the usual manner. In the embodiment illustrated in FIG. 2 a spur gear or output drive element 52 is secured to shaft 50 for rotation thereby. This output member is drivingly engaged with the transmission system 56 which is responsive to the direction of rotation or the output drive element (i.e. the direction of rotation of output shaft 50 of motor 48, due to the polarity of current supplied to the motor) to selectively drive the drive wheels 40.

Figure 6:
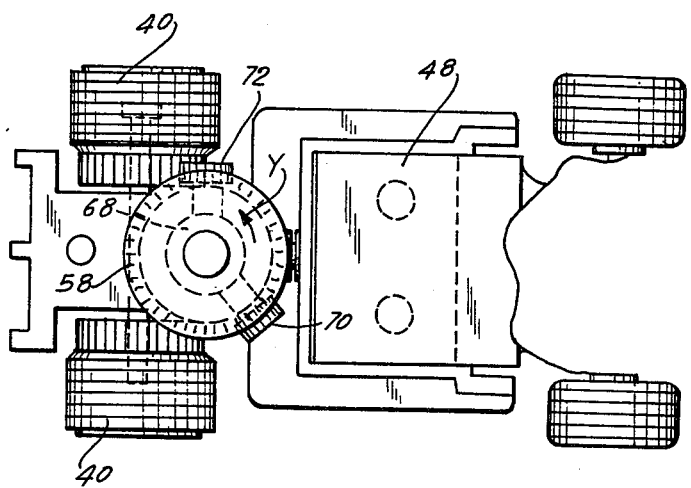
FIG. 6 is a top plan view, similar to FIG. 4, but showing another position of the drive transmissions of the vehicle.

In the embodiment illustrated in FIGS. 2 and 4–6, transmission system 56 includes a crown gear 58 having downwardly extending teeth 60 and a central collar 62. A mounting pin 64 extends through collar 62 and is secured at its lower end 66 in frame 32 so that crown gear 58 is freely rotatably mounted thereon. A movable transmission element including a sleeve or gear support member 68 is rotatably mounted on collar 62. A pair of spur gears 70, 72 are in turn rotatably mounted on sleeve 68 for rotation along axes extending generally perpendicularly to the axis of rotation of crown gear 58. These gears 70, 72 are positioned at an angle to each other (see FIG. 4) in engagement with crown gear 58. As a result of this arrangement when the motor 48 is operated crown gear 58, due to its engagement with the spur gear 52, will be rotated in either a clockwise or counterclockwise direction, as seen in FIGS. 4 and 6, depending upon the polarity of the current supplied to motor 48. At the same time gears 70, 72 will be continuously rotated by the crown gear. However, because gears 70, 72 are mounted on the rotatable sleeve 68, the engagement between the gears 58, 70, 72 will cause sleeve 68, and thus gears 70, 72 to rotate axially about pin 64 and collar 62, in a clockwise or counterclockwise direction according to the direction of rotation of the crown gear. As a result, as seen in FIG. 4, when crown gear 58 is rotated in a clockwise direction indicated by the arrow X gears 70, 72 will also be moved in a clockwise direction so that gear 70 engages the gear 46 of the lower wheel 40 in the vehicle shown in FIG. 4. Thus the right drive wheel of the vehicle will be driven, while the left drive wheel will be free to rotate.

In the game illustrated in FIG. 1 when vehicle 24 is in the outside lane and power is supplied to its right wheel 40 in this manner, as a result of the polarity of current supplied to the motor 48, the toy vehicle will be caused to move from the outer lane to the inner lane, as is shown in FIG. 1 occurring with the vehicle 26. When this occurs the front end of the vehicle will engage the inner wall 16 of the track and the continued drive of its right wheel will cause the vehicle to move along wall 16 in the inner lane 20 of the track. Of course, if the vehicle is moving at a relatively high rate of speed as it goes about a curve in the track it may be propelled by centrifugal force into the outer lane. However, if the drive to the right hand wheel is maintained it will move inwardly again to the inner lane as previously described.

On the other hand, when the polarity of current supplied to the motor 48 is reversed crown gear 58 will rotate in a counterclockwise direction, as illustrated by the arrow Y in FIG. 6. When this occurs gears 70, 72 will be driven in an opposite direction and sleeve 68 will be caused to rotate in the same direction as gear 58. This will engage gear 72 with gear 46 of the left drive wheel 40 (i.e. the upper wheel 40 in FIG. 6) so that this wheel is driven while the right wheel is free to rotate.

When the left wheel of the vehicle is driven in this manner, a bias is applied to the vehicle which will cause it to move to the right. Thus, as illustrated in FIG. 1 by the vehicle 24 shown in dotted lines, when the vehicle is in the inner lane 20 of track 12 and the polarity of the current flow to the motor 48 is changed so that its left wheel 40 is driven, the vehicle will be biased towards its right into outer lane 22. When the front end of the vehicle hits outer wall 14 it will continue to move along that outer wall in outer lane 22 until the polarity of current supplied to the motor 48 is again reversed. In this regard it is noted that because of the arrangement of gears 52, 58, 70 and 72 the vehicle will always be propelled in a forward direction regardless of the direction of rotation of the output element 52 of the motor.

In order to supply current to the toy vehicles the track surface 18 is provided with a pluraltiy of electrical contact strips in each of the lanes 20, 22. In the illustrative embodiment of the invention each lane is provided with three contact strips A, B and C respectively. The strips are formed of an electrically conductive metallic material and are embedded in the track so that they are substantially flush with the surface of the track and present no obstacle to movement of the vehicles from one lane to the other. Current is supplied to these strips, as described hereinafter, and is collected by current collectors mounted on the frame 32 of the toy vehicles in predetermined locations.

In accordance with the present invention the contact strips in each lane are paired with each other, i.e. the A strip in one lane is electrically connected to the A strip in the other lane, the B strips are connected to each other and the C strips are connected to each other. The C strips are connected to electrical ground and the A and B strips are provided to separately supply current and control polarity of the current to the respective vehicles, so that two vehicles can operate in the same lane and still be separately controlled. For this reason the current collector and the vehicles are arranged to associate the respective vehicles with only one of the pairs of contact strips. For example, vehicle 24 will obtain current from strips B, while vehicle 26 will obtain current only from strips A.

As illustrated in FIG. 3 vehicle 24 is provided with two current collectors 111, 112 with the current collector 112 thereof positioned to contact ground strip C. Similarly vehicle 26, illustrated in FIG. 3A, has current collectors 112, 114 mounted thereon with current collector 112 located in the same position as the corresponding collector of vehicle 24 for also contacting the ground strip C. These current collectors are mounted on the vehicle in any convenient manner known in the art, and are electrically connected in a known manner to motor 48 of their respective vehicles. Currrent collector 111 of vehicle 24 is mounted on the vehicle to engage contact strips B regardless of which lane the vehicle is in. As seen in FIG. 3 this current collector is located centrally of the vehicle frame. On the other hand, the current collector 114 of vehicle 26 is located off center from the center line of the vehicle body and in spaced relation to its associated current collector 112. This current collector is positioned to engage contact strips A regardless of the lane in which the vehicle is moving. By this arrangement, each of the operators can separately control current supply and polarity to contact strips A, B to control a respective one of the vehicles 24, 26 regardless of the lane occupied by the vehicle.

Figure 7:
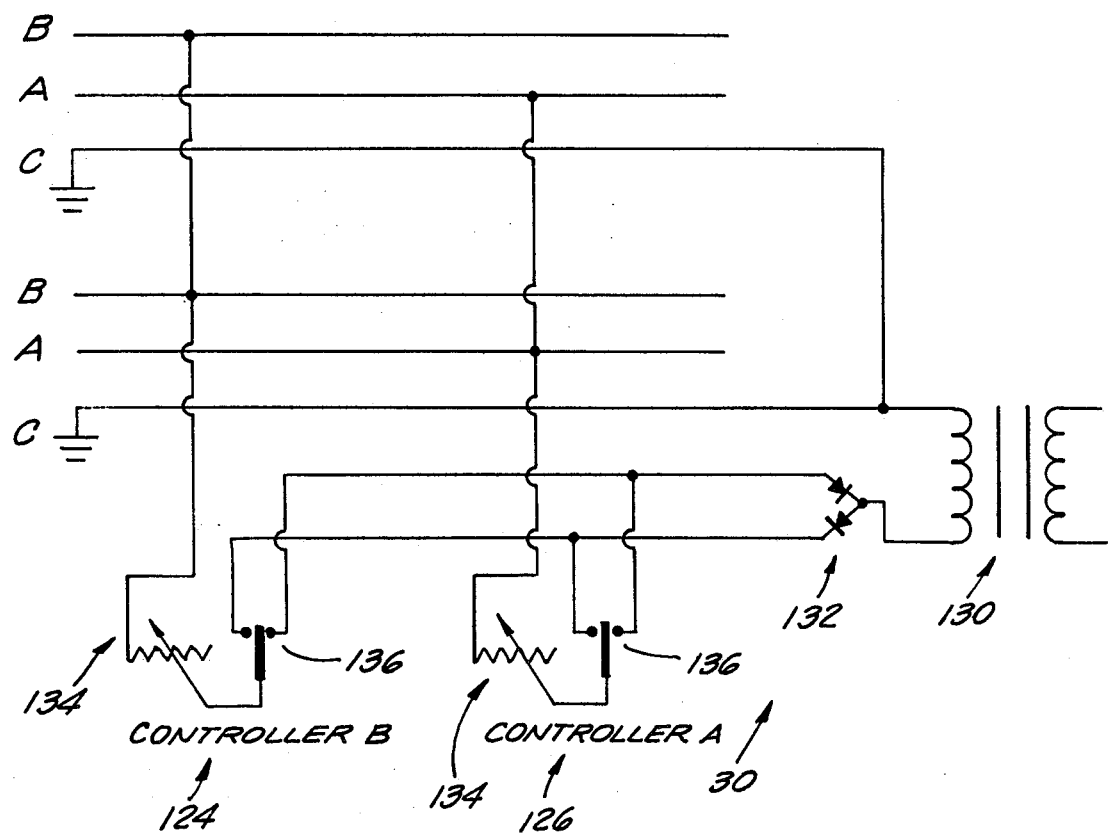
FIG. 7 is a schematic electrical circuit diagram of the electrical control system used for the toy vehicle game of FIG. 1.

The control system 30 for the toy vehicle game illustrated in FIG. 1, is shown schematically in FIG. 7. This control system includes respective controllers 124, 126 by which the players can control the vehicles 24, 26 respectively. Essentially the control system includes a plug 128 by which the system can be connected to an electrical AC power source, and it includes a transformer 130. Power is supplied from the transformer 130 through a halfwave rectifier 132 including two diodes connected as shown to separately supply current to the controllers 124, 126. Each controller is provided as a hand held unit and includes a variable resistor 134, operated as a trigger on the unit, as well as a single pole double throw switch 136. Current from controller 124 is supplied through its variable resistor 134 to the contact strips B and current from the controller 126 is supplied through its variable resistor to the contact strips A. The variable resistors may be of any convenient construction to permit the operators to vary the current supplied to their respective contact strips, and thus their respective vehicles in order to vary the speed of the vehicles.

The polarity of the current supplied to the toy vehicles is separately and independently controlled by switches 136 so that the polarity of current supplied to motor 48 of the respective vehicles, as controlled by the respective controllers, will vary in accordance with the position in which the switches 136 are placed. By this arrangement each player, using his controller 126 or 124, can control the speed of his vehicle along the track 12 and he can also variably position his vehicle along the track simply by changing the polarity of current supplied to the vehicle. As described above the polarity of the current supplied to the motor of the respective toy vehicles will determine which of the two rear drive wheels is powered, and this will determine which lane the vehicle will be driven to.

As illustrated in FIG. 1, when it is desired to switch a vehicle from the outer lane to the inner lane, as shown with vehicle 26, the polarity of current supplied to the vehicle is selected to drive the outer or right wheel of the vehicle thereby moving the vehicle leftwardly into the inner lane. Likewise, when it is desired to move the vehicle outwardly the inner or left wheel of the vehicle is driven, by properly selecting the polarity of current supplied to the motor of the vehicle, so that the vehicle will move toward the right and into the outer lane. Thus the operators have complete control over both the speed of the vehicle and the lane in which the vehicle will move.

When a drone car having a constant speed of movement is utilized, an obstacle is provided in the outer lane of the track which the players must pass in order to continue moving along the track. This enhances the play value of the game as all players will have to pass the drone car during the game at some stage of operation of the game, and this introduces a further variable factor into the game requiring an additional degree of skill and vehicle control in order to win the "race".

Figure 8:
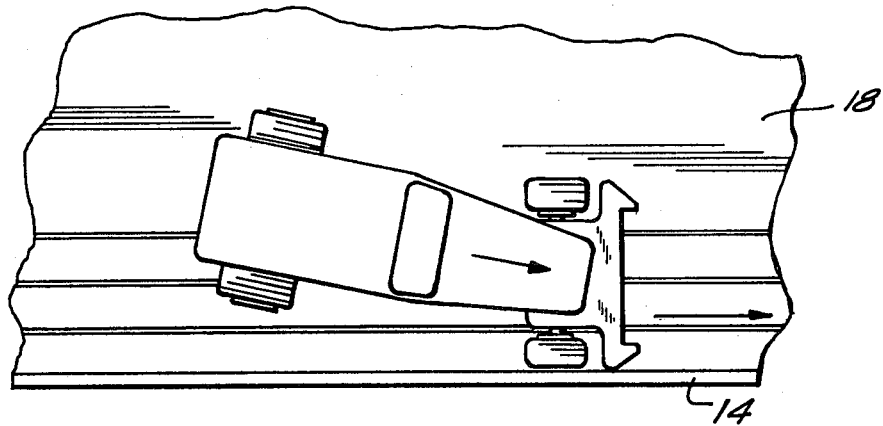
FIG. 8 is an enlarged view illustrating the impact of a vehicle against one of the side walls of the track during a lane change.

As mentioned, the toy vehicles include shock absorbing front ends 38. In the embodiment illustrated in FIG. 3 the front end 38 includes a wheel support plate 130 pivotally mounted by a pivot pin 132 or the like on frame 32 of the vehicle. The plate includes bosses 134 of any convenient form which rotatably mount a shaft 136 on which the front wheels 138 of the toy vehicle are secured. Plate 130 is held in its centered position, so that the front wheels of the vehicle will normally direct the vehicle in a straight line, by a spring arrangement 140 which includes an integral tongue 142 formed with the plastic plate 130. This tongue is captured between a pair of posts or abutment members 144 formed in frame 32. By this arrangement plate 130, and thus wheels 138, are resiliently held in their centered position. However, when the vehicle changes lanes and impacts against one of the side walls (for example the outer walls 14, shown in FIG. 8) the plate 130 will pivot in response to that impact and the shock of that impact will be absorbed by the spring element or tongue 142. At the same time the pivotal movement of the plate will turn wheels 138 therewith and direct them along the desired path of travel, thereby insuring that the vehicle will move into alignment with the contact strips of the track, as quickly and rapidly as possible. To assist in the shock absorbing feature of the invention plate 130 is provided with enlarged bumper elements 146 which extend outwardly beyond the frame of the vehicle so that the bumper elements engage the side wall of the track before the vehicle or any portion thereof.

Figure 3A:
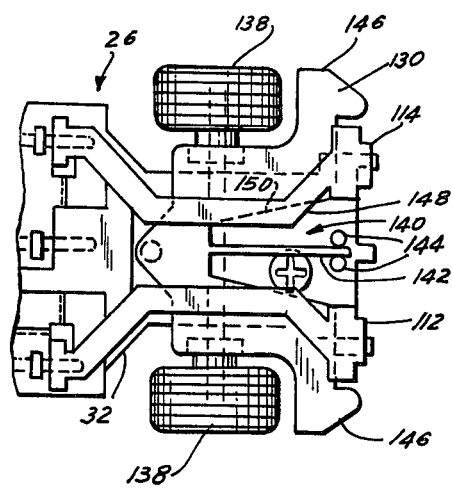
FIG. 3A is a bottom view of the front end portion of a second vehicle used in the game of FIG. 1.

As seen in FIG. 3A tongue 142 is defined between slots 148 formed in plate 130 on opposite sides of the tongue. These slots have outer edges 150 which will engage against posts 144 in the event plate 130 is pivoted a sufficient distance. The engagement of the side edges 150 of the slots against the posts 144 will limit the pivotal movement of the plate beyond a predetermined maximum position.

Accordingly it is seen that a relatively simply constructed toy vehicle game is provided in which players have complete independent control over the speed of operation of the toy vehicles, including the ability to cause the toy vehicles to shift independently from one lane to the other in order to pass each other or to pass a drone car moving along the track in a constant speed. This is achieved without the complexities of multiple element steering systems or solenoid bumper and steering arrangements. Moreover, it is accomplished with a simple change in polarity of the current flow to the toy vehicle's motor and eliminates the attendant loss of speed which occurs with previously proposed structures wherein lane changes are provided as a result of shutting off of power to the vehicle motor.

Although illustrative embodiments of the present invention have been described herein with reference to the accompanying drawings it is to be understood that the invention is not limited to that precise embodiment, but that various changes and modifications may be effected therein by one skilled in the art without departing from the scope or spirit of this invention.

What is claimed is:

1. A toy vehicle game including a relatively flat slotless track having spaced side walls defining a pair of parallely extending lanes therebetween, a toy vehicle comprising, a body, a pair of laterally spaced selectively driven combination drive and steering wheels rotatably mounted on said body for rotation in fixed vertical planes with respect to said frame, a reversible electric drive motor in said body having an output drive element, means operatively engaged between said output drive element and said combination drive and steering wheels for selectively driving one or the other of said drive wheels in the forward direction of travel of the vehicle in response to the direction of rotation of said output drive element and for biasing the vehicle to move in a direction opposite to that of the side of the vehicle on which the driven wheel is located, and means for selectively reversing the polarity of current supplied to said drive motor thereby to control the direction of rotation of said output drive element to selectively drive one of said drive wheels and thus steer the vehicle in a desired direction, thereby to cause said vehicle to move into engagement with one or the other of said side walls, depending upon the polarity of current supplied to said drive motor, and hold the vehicle against the side wall in its selected lane until the polarity of current supplied to the motor is reversed.

2. A control system for a toy vehicle game having a track defining at least two lanes and laterally spaced side walls, and a pair of toy vehicles having reversible electric motors therein and current collector means mounted thereon for collecting current from said track, a pair of independent rotatably mounted combination steering and drive wheels and drive transmission means for driving one or the other of said drive wheels in response to the direction of rotation of said motor to drive the vehicles in a forward direction regardless of the direction of rotation of their motors while biasing the vehicles against and along one or the other of said side walls in accordance with the direction of rotation of said motor, said control system including a plurality of electrically conductive contact strips in each of said lanes with each strip in each lane being electrically connected to a correspondingly positioned strip in the other lane to define electrically connected pairs of strips, a power source, means for electrically connecting said power source to said pairs of strips, and means for selectively and independently reversing the polarity of current from said power source to said pairs of strips; said strips in each lane being located with respect to said side walls of the track to contact the current collectors on the vehicles when the vehicles are engaged against said side walls.

3. A control system as defined in claim 2 wherein one of said pairs of strips is connected through said power source to electrical ground.

4. A control system as defined in claim 3 including means for separately and independently varying the current supply to said other pairs of contact strips.

5. A toy vehicle game including a guide track having a pair of upstanding laterally spaced side walls spaced from one another to define at least two vehicle lanes permitting toy vehicles to move along the track in two parallel paths of travel; a pair of toy vehicles for use on said track, each of said vehicles including a plurality of wheels rotatably mounted thereon, a reversible electric rotary drive motor in said vehicle, means for selectively and independently reversing the polarity of current supplied to said toy vehicles regardless of the track lane they are in, and means operatively connected between said motor and at least one of said wheels for simultaneously driving the vehicle in a forward direction and applying a biasing force to the vehicle to steer said vehicle and hold it against one or the other of said track side walls in response to the polarity of the current supplied to the vehicle while driving the vehicle continuously in a forward direction regardless of the current polarity, whereby the toy vehicles will move in a forward direction along the sidewalls and will switch lanes in response to a current polarity reversal while continuing to move in a forward direction.

6. A toy vehicle game comprising a track having a pair of laterally spaced side walls defining at least two vehicle lanes therebetween, a pair of toy vehicles having reversible motors therein and current collectors mounted thereon for collecting current from said track, said vehicles each having a pair of laterally spaced combination drive and steering wheels rotatably mounted thereon for rotation in fixed vertical planes and means operatively connected between said motor and said wheels for driving one or the other of said drive wheels to drive the vehicle in a forward direction while applying a biasing force to said vehicle to hold the vehicle against one or the other of said walls in accordance with the polarity of current supplied to said motor while continuously driving said vehicle in a forward direction regardless of the current polarity; and a control system controlling movement of said toy vehicles including at least three electrically conductive contact strips on said track in each of said lanes located in parallel relation to each other, with each strip in each lane being electrically connected to a corresponding strip in the outer lane to define pairs of electrically connected contact strips with one of said pairs of strips being connected to electrical ground; means for separately controlling current flow to the other two pairs of contact strips; and means on each of said vehicles for electrically contacting the ground connected contact strip and one of the other strips in the lane for supplying current to the vehicle while the vehicle is engaged with and moves along the side walls adjacent the lane in which the vehicle is moving, with the contact means on each of said vehicles being respectively positioned to contact a different one of the strips in said other two pairs of strips whereby the vehicle's drive motor can be separately controlled in each lane with both of said vehicles occupying the same lane; whereby said toy vehicles are continuously driven in a forward direction through one or the other of its drive wheels regardless of the polarity of current supplied to the vehicle's motor while being biased against one or the other of said walls in accordance with the polarity of current supplied to the vehicle and until the polarity of current supplied to the motor is reversed.

7. A toy vehicle game comprising a guide track having a slotless track surface and a pair of laterally spaced upstanding side walls spaced from one another to define at least two vehicle lanes permitting toy vehicles to move along the track surface in two parallel paths of travel; a pair of toy vehicles for use on said track, each comprising a frame, a pair of laterally spaced selectively driven combination steering and drive wheels rotatably mounted on said frame for rotation in fixed vertical planes, a reversible electric rotary drive motor in the frame and means operatively engaged between said drive motor and said combination steering and drive wheels for selectively driving one or the other of said wheels in the forward direction of travel of the vehicle in response to the direction of the drive motor whereby said motor drives the vehicle in a forward direction of rotation of the motor and steers the vehicle through the driven wheel into engagement with one or the other of said side walls depending upon the direction of rotation of the drive motor.

8. A toy vehicle game as defined in claim 7 including means for separately supplying current to the electric motors in said toy vehicles comprising a plurality of continuous electrical supply contacts extending along each of the lanes, means for separately controlling current flow to at least two contacts in each lane and means on each of said vehicles for electrically associating the vehicle with only one of said at least two contacts, with each vehicle being associated with a different one of said at least two contacts.

9. A toy vehicle as defined in claim 8 wherein each of said lanes includes at least three electrically conductive strips extending therealong including a ground contact strip and two electrical supply contact strips, said strips being in the same relative positions in each lane and said vehicles each having a pair of current collectors thereon including one collector located in the same position on each vehicle for contacting the ground strip of the lane in which the vehicle is moving and a second collector mounted on the vehicle for contact with only one of the supply contact strips, with the second collector in each vehicle located in different positions with respect to each other whereby the second collector of each vehicle will engage only one current supply contact strip in each lane and the vehicles can be separately controlled.

10. A toy vehicle game as defined in claim 9 wherein each of said electrical supply contact strips in each lane is electrically connected to a corresponding contact in the other lane whereby the toy vehicles can be separately controlled in each of said lanes.

11. A toy vehicle game as defined in claim 10 wherein said track and toy vehicles are dimensioned such that the toy vehicles engage and are guided by said side walls of the track when the current collectors thereon are engaged with the contact strips of the track lanes whereby the drive to one of the drive wheels of the vehicle continuously urges the vehicle against the side wall of the track adjacent the lane occupied by the vehicle thereby to hold the vehicle in its lane until the polarity of current supplied to the drive motor is reversed.

12. A toy vehicle game defined in claim 11 wherein said guide track is an endless track and the distance between said upstanding side walls is more than double the width of said vehicle frame.

* * * * *

UNITED STATES PATENT AND TRADEMARK OFFICE
CERTIFICATE OF CORRECTION

PATENT NO. : 4,078,799
DATED : March 14, 1978
INVENTOR(S) : Robert G. Lahr

It is certified that error appears in the above-identified patent and that said Letters Patent are hereby corrected as shown below:

Column 9, line 57 (claim 6, line 37) insert --each-- before "continuously";

Column 10, line 13 (claim 7, line 11) insert --rotation of-- after "direction of";

Column 10, line 14 (Claim 7, line 12) delete "of"; and

Column 10, line 15 (Claim 7, line 13) delete "rotation of the motor".

*Signed and Sealed this*

*Twenty-sixth* Day of *December 1978*

[SEAL]

Attest:

RUTH C. MASON
*Attesting Officer*

DONALD W. BANNER
*Commissioner of Patents and Trademarks*